July 24, 1923.

H. G. WILLETTS

GLASS MELTING TANK

Filed May 4, 1922

WITNESS
R. F. Dilworth

INVENTOR.
H. G. Willetts
BY F. N. Barber
ATTORNEY

Patented July 24, 1923.

1,462,993

UNITED STATES PATENT OFFICE.

HARRY G. WILLETTS, OF CRAFTON, PENNSYLVANIA, ASSIGNOR TO THE WILLETTS COMPANY, OF PITTSBURGH, PENNSYLVANIA, A CORPORATION OF PENNSYLVANIA.

GLASS-MELTING TANK.

Application filed May 4, 1922. Serial No. 558,378.

*To all whom it may concern:*

Be it known that I, HARRY G. WILLETTS, a citizen of the United States, residing at Crafton, in the county of Allegheny and State of Pennsylvania, have invented new and useful Improvements in Glass-Melting Tanks, of which the following is a specification.

My invention relates to glass melting tanks. It is the object of this invention to provide a glass-melting tank with means whereby the highly refractory bricks, of which it is made, shall have a longer life than the ordinary brick melting tanks known to me. Molten glass is very destructive to the common melting tanks and it is my object to provide the constituent bricks, preferably externally, with means to increase the radiation of heat therefrom, thereby reducing the temperature at the contact surfaces of the molten glass with the bricks.

Figure 1:
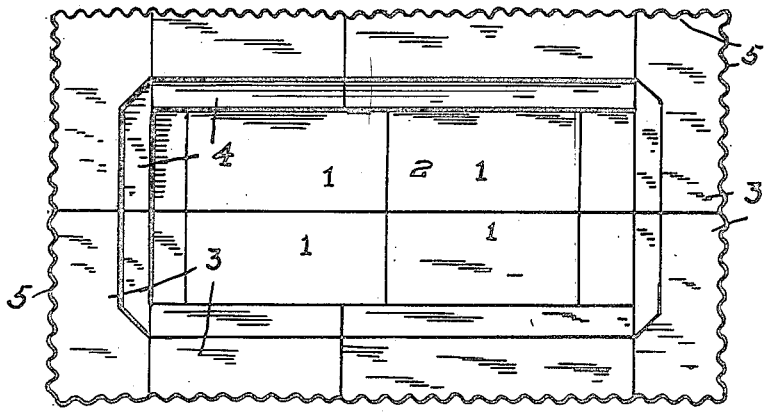
Figure 2:
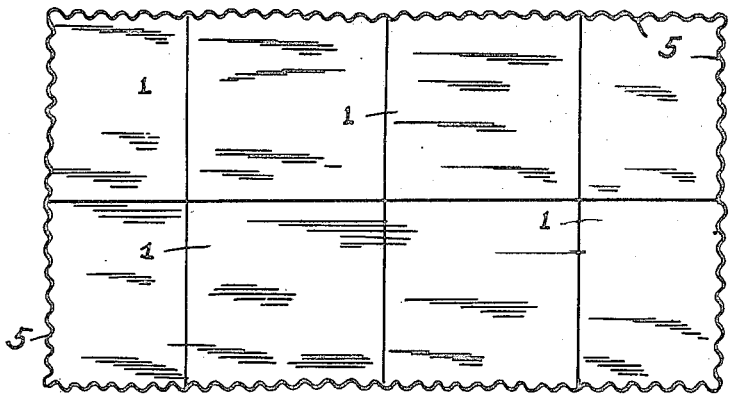

Referring to the accompanying drawing, Fig. 1 is a plan view of a glass-melting tank embodying my invention, the usual means for retaining the constituent bricks in their assembly being omitted. Fig. 2 is a bottom plan view of Fig. 1; and Fig. 3, a longitudinal vertical section of Fig. 1.

Figure 3:
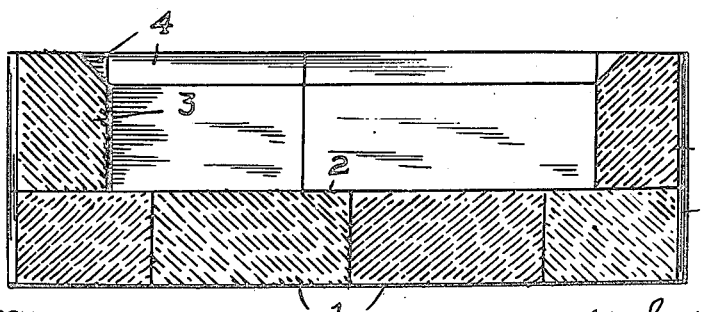

On the drawing, I show a glass-melting tank composed of a horizontal layer of refractory bricks 1 composed of fire-clay or other similar composition suitable for the purpose, and assembled to form an upper horizontal surface 2 preferably in one plane. Upon the said surface and at the edges thereof, I arrange other refractory bricks 3 so as to form with the said surface 2 a glass-containing tank. Preferably the upper inner corners of the bricks 3 are beveled as shown at 4. The bricks 1 and 3 are superposed preferably so as to break joints as shown in Figs. 1 and 3. The outer faces of the bricks 3, and preferably also of the bricks 1, are provided with projections which I have shown in the form of vertical rounded ribs 5, which materially increase the radiating area of the lateral exterior surface of the tank and materially reduce the temperature of the inner surfaces of the bricks, thereby prolonging the life of the bricks and reducing the transference of portions of the bricks to the molten glass. I do not limit my invention to the precise nature or shape of the projections on the bricks except as specifically described in the appended claims.

I claim—

1. A glass-melting tank having its lateral walls containing refractory bricks, some having one face provided with ribs, the latter being on the outer surface of said tank.

2. A glass-melting tank having its lateral walls containing refractory bricks, some having one face provided with vertical ribs, the latter being on the outer surface of said tank.

Signed at Pittsburgh, Pa., this 3rd day of May, 1922.

HARRY G. WILLETTS.